(12) United States Patent
Yuan et al.

(10) Patent No.: US 6,664,875 B2
(45) Date of Patent: Dec. 16, 2003

(54) MATRIX-TYPE SUPERCONDUCTING FAULT CURRENT LIMITER

(75) Inventors: Xing Yuan, Albany, NY (US); Drew W. Hazelton, Selkirk, NY (US)

(73) Assignee: IGC-Superpower, LLC, Schenectady, NY (US)

( * ) Notice: Subject to any disclaimer, the term of this patent is extended or adjusted under 35 U.S.C. 154(b) by 129 days.

(21) Appl. No.: 10/051,671

(22) Filed: Jan. 17, 2002

(65) Prior Publication Data

US 2003/0021074 A1 Jan. 30, 2003

Related U.S. Application Data

(60) Provisional application No. 60/262,433, filed on Jan. 17, 2001.

(51) Int. Cl.$^7$ .................................................. H01F 1/00
(52) U.S. Cl. ............................ 335/216; 324/318; 361/19
(58) Field of Search ................................ 324/318–321; 335/216, 296–299; 361/58, 93, 115, 19; 306/850, 872, 883, 888; 307/245, 306

(56) References Cited

U.S. PATENT DOCUMENTS

| | | | | |
|---|---|---|---|---|
| 5,617,280 A | * | 4/1997 | Hara et al. | ..................... 361/19 |
| 5,726,848 A | * | 3/1998 | Boenig | ......................... 361/93 |
| 6,275,365 B1 | * | 8/2001 | Kalsi et al. | ................... 361/19 |

* cited by examiner

*Primary Examiner*—Lincoln Donovan
(74) *Attorney, Agent, or Firm*—Katten Muchin Zavis Rosenman

(57) ABSTRACT

A modular and scalable Matrix-type Fault Current Limiter (MFCL) that functions as a "variable impedance" device in an electric power network, using components made of superconducting and non-superconducting electrically conductive materials. The detection of a fault and subsequent activation of the current-limiting impedance of the MFCL are done passively by built-in matrix design, without assistance of active control mechanisms.

10 Claims, 10 Drawing Sheets

MATRIX-TYPE SUPERCONDUCTING FAULT CURRENT LIMITER

This application claims the benefit under 35 U.S.C. §119(e) from provisional application Ser. No. 60/262,433 filed on Jan. 17, 2001.

FIELD OF THE INVENTION

This invention relates to a current limiting device for use in electric power transmission and distribution systems.

BACKGROUND OF THE INVENTION

In electric power transmission and distribution systems, a fault current condition may result from events such as lightning striking a power line, or downed trees or utility poles shorting the power lines to ground. Such events create a surge of current through the electric power grid system (EPGS) that can cause serious damage to the EPGS equipment. Switchgears are deployed within electric distribution and transmission substations to protect substation equipment from such damages. However, due to the continuing growth of power demands and increased inter- and/or intra-connections between power distribution networks, transmission networks, and power generation sources, fault current level could be increasing to a level that exceeds the original fault current interrupting capabilities of the switchgears. Application of current limiters would reduce the available fault current to a safer level where the switchgears can perform their protective function for the EPGS, without resorting to other expensive measures such as replacing all the switchgears or building new substations.

Superconductors, especially high-temperature superconducting (HTS) materials, are well suited for use in a current limiting device because of their intrinsic properties that can be manipulated to achieve the effect of a "variable impedance" under certain operating conditions. A superconductor, when operated within a certain temperature and external magnetic field range (i.e., the "critical temperature" ($T_C$) and "critical magnetic field" ($H_C$) range), exhibits no electrical resistance if the current flowing through it is below a certain threshold (i.e., the "critical current level" ($J_C$)), and is therefore said to be in a "superconducting state."

However, if the current exceeds this critical current level the superconductor will undergo a transition from its superconducting state to a "normal resistive state." This transition of a superconductor from a superconducting state to a normal resistive state is termed "quenching". Quenching can occur if any one or any combination of the three factors, namely the operating temperature, external magnetic field or current level, exceeds their corresponding critical level.

The surface plot shown in FIG. 1 illustrates the interdependency among these three factors ($T_C$, $H_C$, and $J_C$) for a typical superconducting material. As shown in FIG. 1, the surface plot includes three axes T, H, and J, where $T_C$ is the critical temperature below which the superconducting material must be cooled to remain in the superconducting state, where $H_C$ is the critical magnetic field above which the superconducting material cannot be exposed in order to remain in a superconducting state, and where $J_C$ is the critical current density in the superconducting material that cannot be exceeded for the superconductor to remain in a superconducting state.

The "critical J-H-T surface" represents the outer boundary outside of which the material is not in a superconducting state. Consequently, the volume enclosed by the critical J-H-T surface represents the superconducting region for the superconducting material.

A superconductor, once quenched, can be brought back to its superconducting state by changing the operating environment to within the boundary of its critical current, critical temperature and critical magnetic field range, provided that no thermal or structural damage was done during the quenching of the superconductor. An HTS material can operate near the liquid nitrogen temperature (77K) as compared with a low-temperature superconducting (LTS) material that operates near liquid helium temperature (4K). Manipulating properties of a HTS material is much easier because of its higher and broader operating temperature range.

The quenching of a superconductor to the normal resistive state and subsequent recovery to the superconducting state corresponds to a "variable impedance" effect. A superconducting device with such characteristics is ideal for a current limiting application. Such a device can be designed so that under normal operating conditions, the operating current level is always below the critical current level of the superconductors, therefore no power loss ($I^2R$ loss) will result during the process. When the fault occurs the fault current level exceeds the critical current level of the superconducting device thus creating a quenching condition. By the same token, mechanisms altering the device operating temperature and/or magnetic field level can be put in place either as a catalyst or an assistant to achieving fast quenching and recovery of such a superconducting device.

McDougall, et al., U.S. Pat. No. 6,043,731, entitled "Current Limiting Device," describes a superconductor device that uses an active control mechanism to adjust the critical current level of a superconductor. Under the normal operating condition, a magnetic field is applied to the superconductor, causing its critical current level to be less than the maximum. An active control scheme is in place to adjust the critical current density of the superconductor under the fault condition so that its critical current level is below the fault current level, triggering the quenching of the superconductor, thus introducing the current limiting impedance into the circuit it is connected to. After the fault current is limited, this control mechanism is used to increase the critical current level of the superconductor causing the superconductor to return to its superconducting state. A drawback of the current limiting device of McDougall, et al. it that it requires an active control scheme incorporating an external power supply source to achieve the effect of "adjustable impedance," which increases the complexity and cost of the design and raises reliability issues.

Saravolac, U.S. Pat. No. 6,137,388, dated Oct. 24, 2000 and entitled "Resistive Superconducting Current Limiter," describes a superconductor that is placed inside a nonmetallic cryostat filled with a cooling medium to maintain the superconductor in a superconductive state. A foil winding is connected in series with the superconductor by current leads and the cryostat is placed inside the winding. Under normal operating conditions, the current in the foil winding generates a persistent magnetic field that is parallel to the superconductor, with the current below the critical current level and the persistent magnetic field below the critical magnetic field of the superconductor. In the event of a fault, the current in the foil winding increases to a level that generates a magnetic field that exceeds the critical magnetic field of the superconductor and triggers the superconductor to a resistive state. This invention does achieve passive triggering of the superconductor quenching. A drawback of Saravolac's current limiting device of it that the foil winding that provides trigger magnetic field during a fault also puts the superconductor in a persistent magnetic field under normal operating mode. This persistent magnetic field is sufficient enough to degrade the superconductor's performance. Furthermore, it would be very difficult to locate superconducting materials in the uniformed magnetic field region within such a device to reduce mechanical stress exerted by the Lorentz force (i.e., Force (F) acting on a moving particle with charge q and velocity v in a magnetic field B, where F=q v×B). In addition, there will always be a voltage drop across this device because of the inductive nature of the foil windings and substantial $I^2R$ loss associated with such a design.

It is therefore an object of this invention to provide a current limiter that, under normal operating condition, will pass current through path(s) composed of only superconducting components that are not under any influence of an external magnetic field.

It is another object of this invention to provide a current limiter that detects and limits fault current, and subsequently recovers to its superconducting state automatically without resort to incorporating any kind of active switching and controlling mechanism.

It is yet another object of this invention to provide a current limiter that is composed of easily acquired modular components that enable scalability for a range of applications and operating scenario as are used in varieties of electric power distribution and transmission networks.

It is yet another object of this invention to provide a current limiter that is highly reliable with built in redundancy in the design such that a failure of any individual component does not result in a failure of the entire device.

SUMMARY OF THE INVENTION

The present invention is a current limiting device incorporating components made of superconducting and non-superconducting electrically conductive materials. This so-called Matrix-type Fault Current Limiter (MFCL) device includes a trigger matrix having "1×n" (column×row) number of trigger elements electrically connected in series with a current limiting matrix containing "m×n" number of current-limiting elements. Each trigger element within the trigger matrix includes one non-inductively arranged superconducting component electrically connected in parallel with a non-superconducting inductor group containing "1+m" number of parallel connected inductors. Each current limiting element within the current limiting matrix includes one non-inductively arranged superconducting component electrically connected in parallel with one non-superconducting inductor.

The "1+m" number of inductors in the inductor group of a trigger element are physically wound around the respective superconducting component in the "1" trigger element plus "m" number of current limiting elements that have the same row number in both matrices.

The number of rows "n" in the matrices is determined by the peak normal operating current level (with consideration given to any normal fluctuation of such a current level) that passes through the MFCL of the present invention. This peak current level (plus whatever fluctuation level to be included), divided by the number of rows in the MFCL matrices, at minimum, should not exceed the critical current level of each individual superconducting component used in the MFCL matrices (assuming the device uses only identical superconducting elements). More rows can be added to increase the redundancy of the design and therefore overall reliability of the MFCL device. The number of columns "m" in the current limiting matrix is primarily determined by the current limiting impedance required for a specific electric network, making an MFCL design highly scalable.

Under the normal operating condition, the current passes through only the non-inductively arranged superconducting components within the MFCL device, thus producing no voltage drop across the device or $I^2R$ loss due to the zero electrical resistance nature of the superconducting materials. However, when a fault condition occurs the surged current in the electric network exceeds the critical current level of the superconducting components, creating a transition from a superconducting state to a normal resistive state.

Such a transition creates a current sharing regime between the superconducting component and the inductor group in a trigger matrix element, and between the superconducting component and the inductor in a current limiting matrix element. The diverted current in each of the "1+m" inductors within a trigger matrix element will in turn generate a substantial magnetic field that surrounds each superconducting component in the "1" trigger matrix element and "m" number of current limiting matrix elements. This magnetic field is designed to exceed the critical magnetic field level of the superconducting components in the device, therefore further speed up superconductors' transition from the superconducting state to the resistive state, thus introducing the necessary current-limiting impedance of the MFCL device into the electric network.

All three factors, namely the current surge that exceeds the critical current level of superconducting components, the superconductor temperature rise associated with heating by the excessive current, and the external magnetic field generated by the current sharing regime, work to promote the transition of superconductors in the MFCL from the superconducting state to the resistive state. The parallel-connected inductors in both the trigger and current limiting matrices serve to protect the superconducting components from a transient voltage surge that is usually associated with the rapid increase of the fault current level. The partial divergence of the surged current to the inductors also serves to reduce the thermal energy that the superconductors must absorb during the current limiting phase of the MFCL operation. This makes fast recovery of an MFCL device to its superconducting state more attainable.

DETAILED DESCRIPTION OF THE INVENTION

Figure 1:
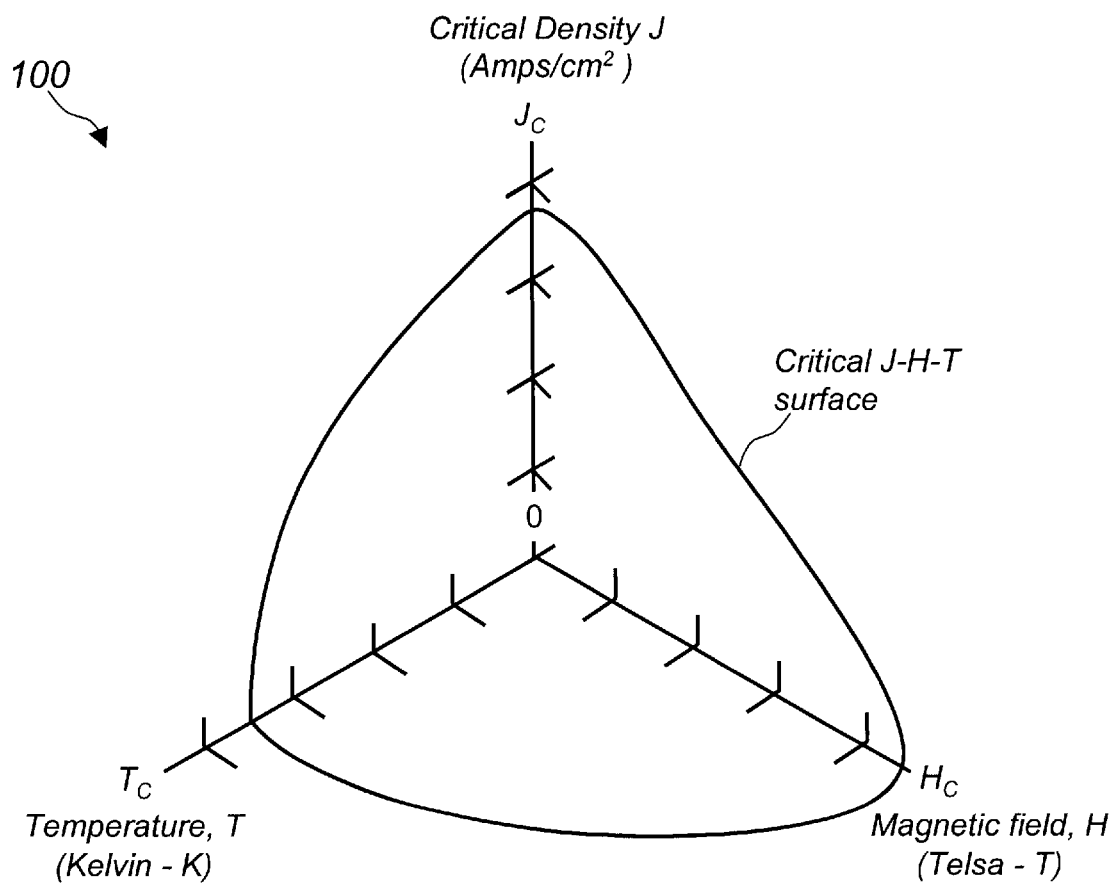
FIG. 1 shows the inter-dependency of critical current level, critical temperature and critical magnetic field of a typical superconducting material.
Figure 2:
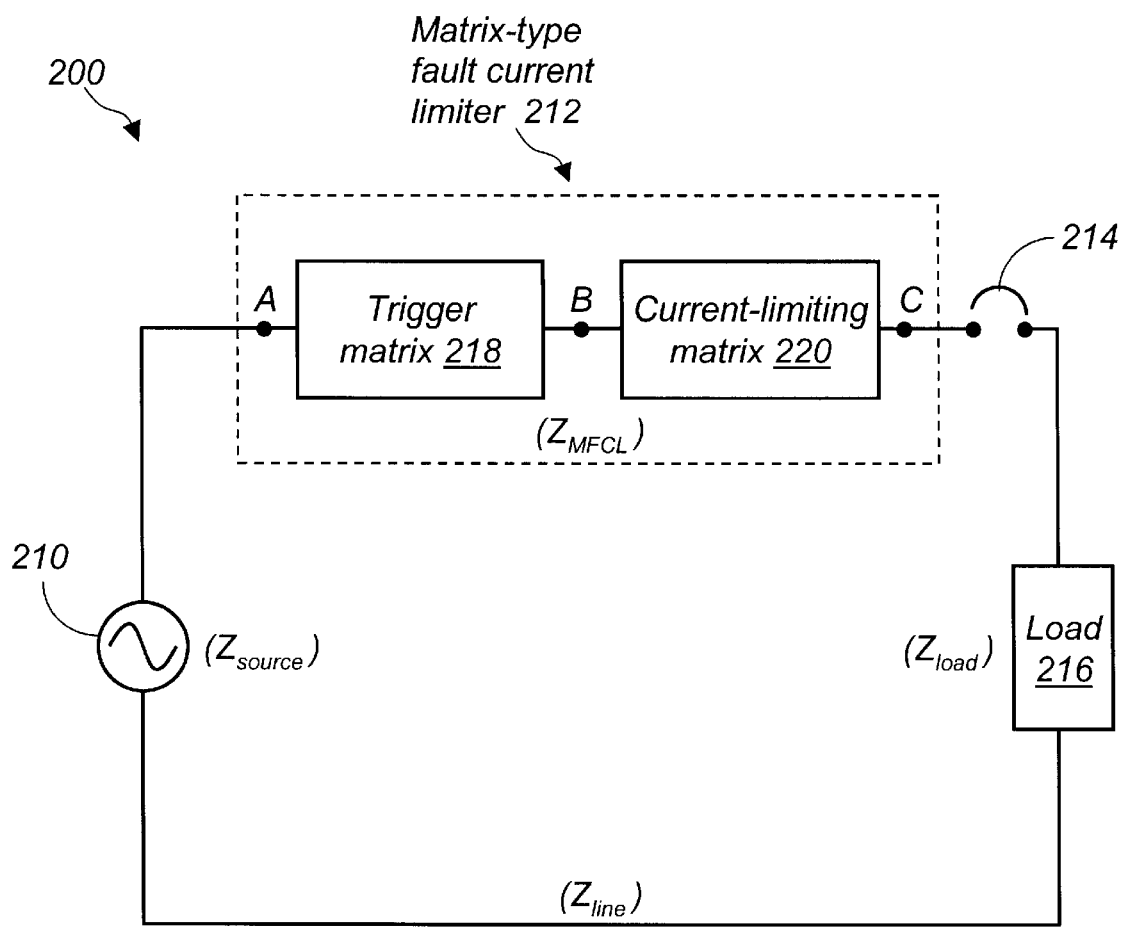
FIG. 2 shows an example of an MFCL device being used in an AC circuit that is representative of a single-phase EPGS in its simplest form.

FIG. 2 shows an AC circuit 200 that is representative of a single-phase EPGS in its simplest form. The AC circuit 200 includes an AC source 210 that is a single-phase power source in a three-phased electricity transmission or distribution network with associated impedance $Z_{Source}$ and overall line impedance $Z_{Line}$. The AC source 210 supplies a load 216 that has associated impedance $Z_{Load}$. Electrically connected in series between the AC source 210 and the load 216 is an MFCL 212 device having an associated impedance $Z_{MFCL}$ when a fault condition occurs, and a conventional circuit breaker 214. Absent the MFCL 212 in the AC circuit 200, the fault current level when the load 216 is electrically shorted to ground is determined by $i_1 = V_{Source}/(Z_{Source} + Z_{Line})$. However, the inclusion of the MFCL 212 in the AC circuit 200 limits the fault current level to a value $i_2 = V_{Source}/(Z_{Source} + Z_{Line} + Z_{MFCL})$. As long as $Z_{MFCL}$ is non-zero when the fault occurs, the $i_2$ level is lower than $i_1$, thus achieving the fault current limiting function. If $i_2$ is limited to within the designed fault current interrupting capability of the circuit breaker 214, the circuit breaker 214 will be able to function normally, thereby providing protection to the EPGS and customer equipment.

The MFCL 212 of the present invention functions essentially as a "variable impedance" in an electric network. Under normal operating conditions the impedance of the MFCL 212 device is essentially zero. When there is a sudden surge of current in the network, due to presence of a fault condition, the MFCL 212 immediately introduces a certain designed amount of impedance $Z_{MFCL}$ into the network, thus achieving the current limiting function. As described earlier, superconducting materials can undergo a transition from a superconducting no-electrical-resistance state to a normal resistive state (i.e., quenching) when any one or any combination of three factors, namely the passed-through current, the external magnetic field and the operating temperature, exceeds their corresponding "critical level." The quenching of a superconductor and subsequent recovery to its superconducting state corresponds to a "variable impedance" effect. The "variable impedance" feature of the MFCL 212 is achieved by incorporating such superconducting components into the device design and by manipulating the three factors that trigger the quenching of those superconducting components. The superconducting components are represented by variable resistance symbols in all the figures contained within.

As shown in FIG. 2, the MFCL 212 includes a trigger matrix 218 arranged between a node A and a node B in series with a current-limiting matrix 220 that is arranged between node B and a node C. The primary function of the trigger matrix 218 is, under a fault condition, to create additional magnetic field that is sufficient enough to trigger the quenching of superconducting components in the current-limiting matrix 220. The primary role of the current-limiting matrix 220 is to provide majority of the required overall current-limiting impedance once the superconducting components in the MFCL 212 are transitioned to their resistive state during the fault.

Figure 3:
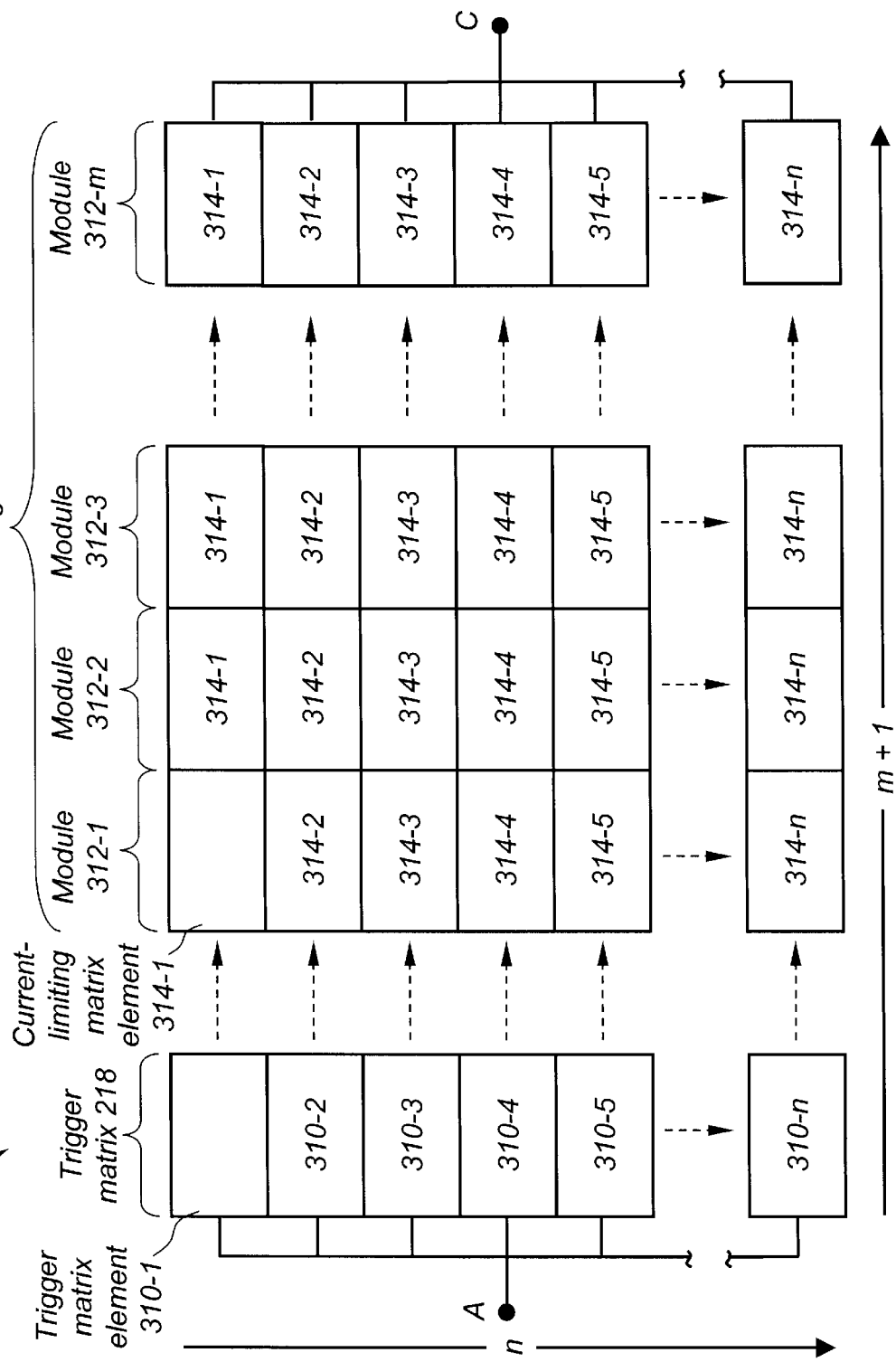
FIG. 3 illustrates a high-level block diagram of the MFCL device containing a "1×n" (column×row) trigger matrix and an "m×n" current limiting matrix.

FIG. 3 illustrates a high-level block diagram of the MFCL 212 that includes a "1×n" (column×row) trigger matrix 218 and an "m×n" current-limiting matrix 220. The trigger matrix 218 includes a plurality of trigger matrix elements 310 (i.e., trigger matrix elements 310-1 through 310-n) while the current-limiting matrix 220 contains a plurality of current-limiting modules 312 (i.e., modules 312-1 through 312-m). Each current-limiting module 312 includes a plurality of current-limiting elements 314 (i.e., current-limiting elements 314-1 through 314-n). Each trigger matrix element 310 is to trigger "m" number of current-limiting elements 314 that have the same row number. For example, trigger element 310-1 is to trigger all current-limiting elements 314-1 of modules 312-1 through 312-m.

Figure 4:
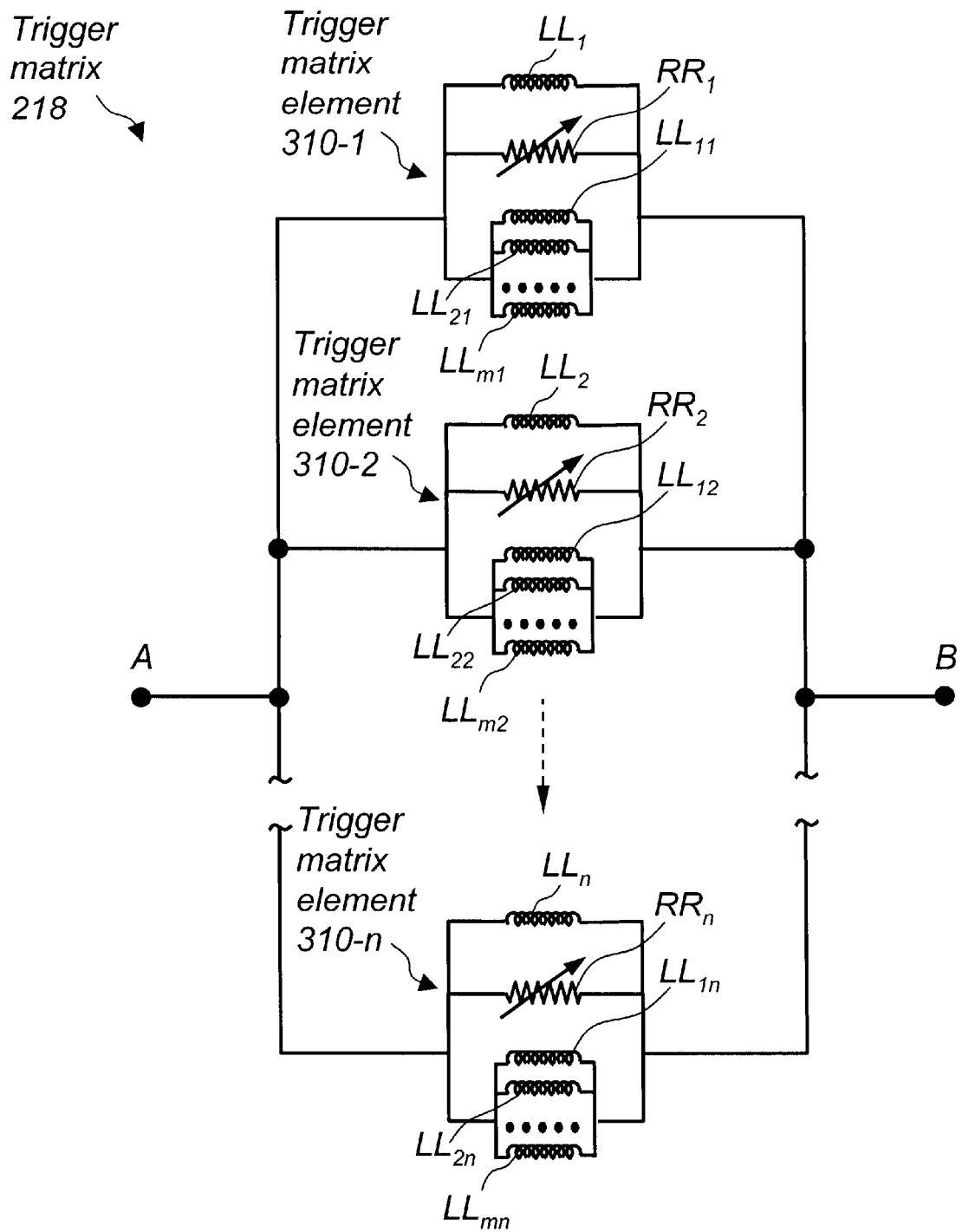
FIG. 4 shows a schematic diagram of a preferred embodiment of a trigger matrix within the MFCL of this invention that includes a plurality of trigger matrix elements (the rows in the trigger matrix) 1 through "n" electrically connected in parallel.

FIG. 4 shows a schematic diagram of a preferred embodiment of the trigger matrix 218 that includes a plurality of trigger matrix elements 310 (i.e., trigger matrix elements 310-1 through 310-n) electrically connected in parallel between nodes A and B of the MFCL 212. Each trigger matrix element 310 further includes a superconductor RR arranged in parallel with "m+1" number of inductors LL. For example, the trigger matrix element 310-1 includes a superconductor $RR_1$ arranged in parallel with both inductor $LL_1$ and a plurality of inductors $LL_{11}$ through $LL_{m1}$. Likewise, the trigger matrix element 310-2 includes a superconductor $RR_2$ arranged in parallel with both inductor $LL_2$ and a plurality of inductors $LL_{12}$ through $LL_{m2}$. As a last example, the trigger matrix element 310-n includes a superconductor $RR_n$ arranged in parallel with both inductor $LL_n$ and a plurality of inductors $LL_{1n}$ through $LL_{mn}$.

Figure 5:
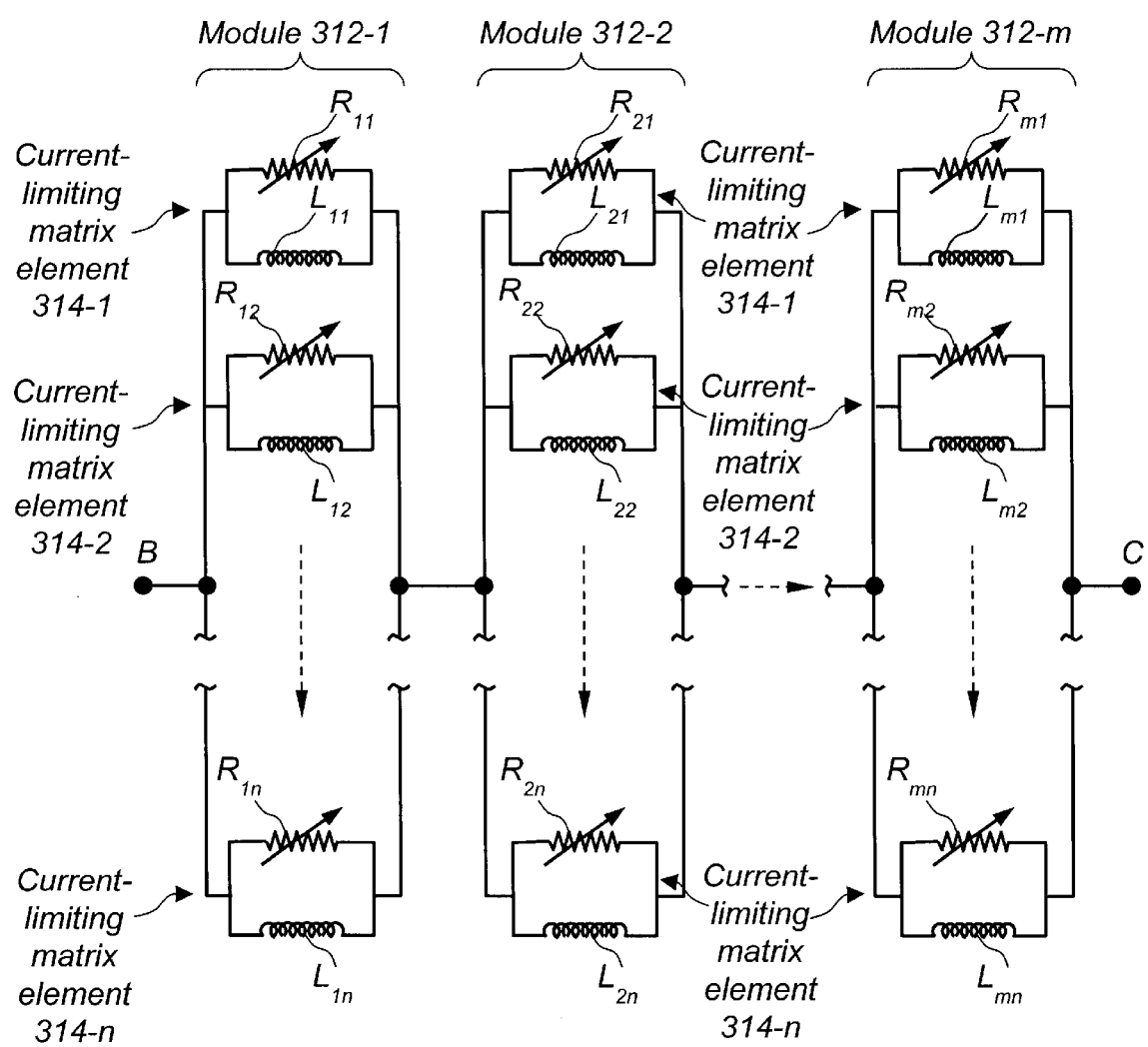
FIG. 5 shows a schematic diagram of a preferred embodiment of a current limiting matrix of this invention that includes a plurality of current-limiting modules (the columns in the current-limiting matrix) 1 through "m" electrically connected in series.

FIG. 5 shows a schematic diagram of a preferred embodiment of the current-limiting matrix 220 that includes a plurality of current-limiting modules 312 (i.e., modules 312-1 through 312-m) electrically connected in series between nodes B and C of the MFCL 212. Each module 312 further includes a plurality of current-limiting matrix elements 314 (i.e., current-limiting matrix elements 314-1 through 314-n) electrically connected in parallel. The current-limiting matrix 220 is therefore an "m×n" matrix having "m" number of current-limiting modules 312 while each of these modules contains "n" number of current-limiting matrix elements 314. Each current-limiting matrix element 314 includes a parallel electrical arrangement of a superconductor R and an inductor L. For example, the current-limiting matrix element 314-1 of the module 312-1 includes a superconductor $R_{11}$, arranged in parallel with an inductor $L_{11}$. As a second example, the current-limiting matrix element 314-n of the module 312-1 includes a superconductor $R_n$ arranged in parallel with an inductor $L_{1n}$. As a third example, the current-limiting matrix element 314-1 of the module 312-m includes a superconductor $R_{m1}$, arranged in parallel with an inductor $L_{m1}$. As a last example, the current-limiting matrix element 314-n of the module 312-m includes a superconductor $R_{mn}$ arranged in parallel with an inductor $L_{mn}$.

Figure 6:
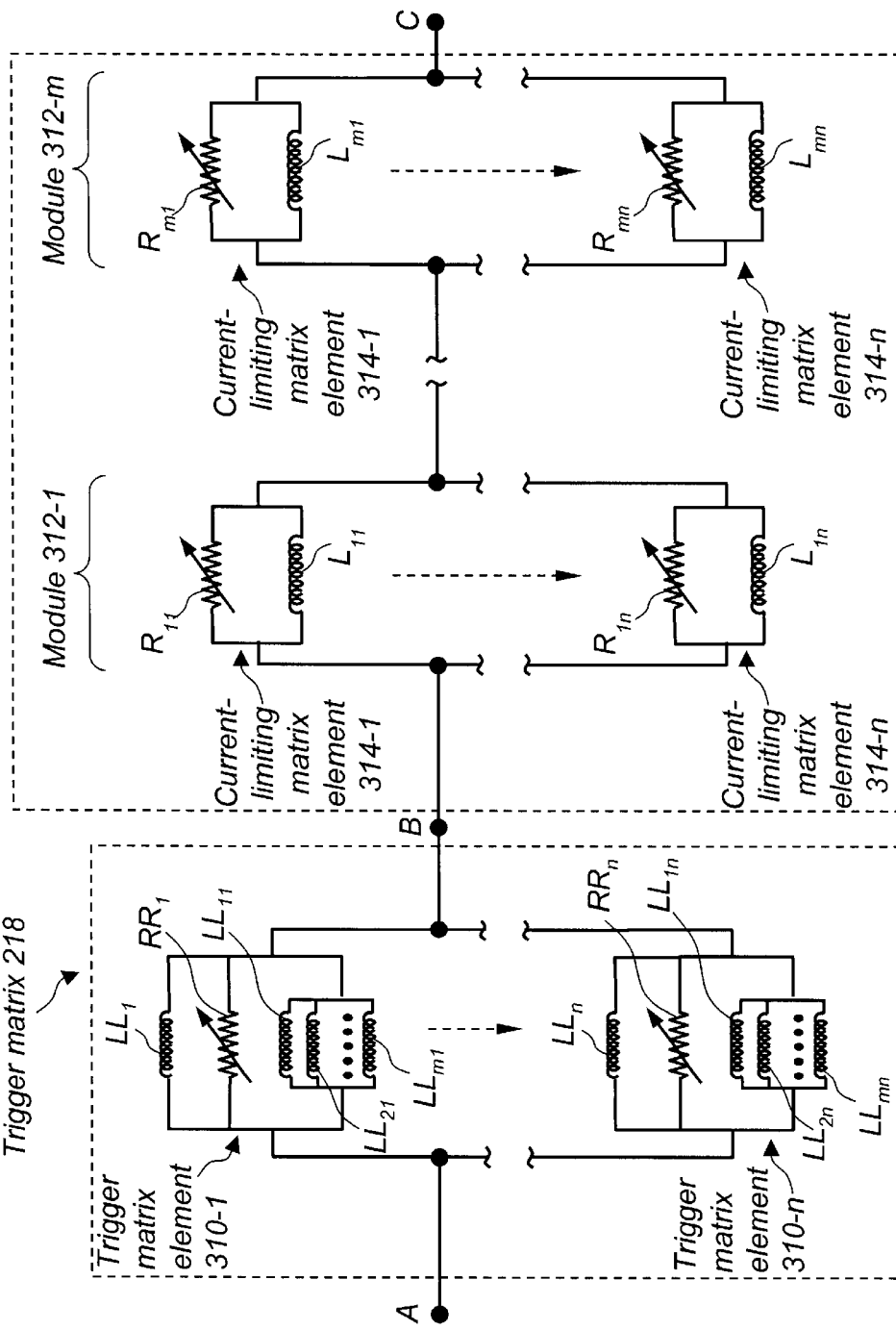
FIG. 6 shows a schematic diagram of a preferred embodiment of a complete MFCL of this invention that includes both the trigger and current-limiting matrices.

FIG. 6 gives a more comprehensive overview of the schematic diagrams of the trigger matrix 218 (FIG. 4) and the current-limiting matrix 220 (FIG. 5) in the context of a complete MFCL 212 device.

Not shown in FIGS. 4, 5 and 6 are the physical relationships relative to one another, of superconductors and inductors within the trigger matrix 218 and current-limiting matrix 220. These relationships can best be illustrated by a simplified example shown in FIG. 7.

Figure 7:
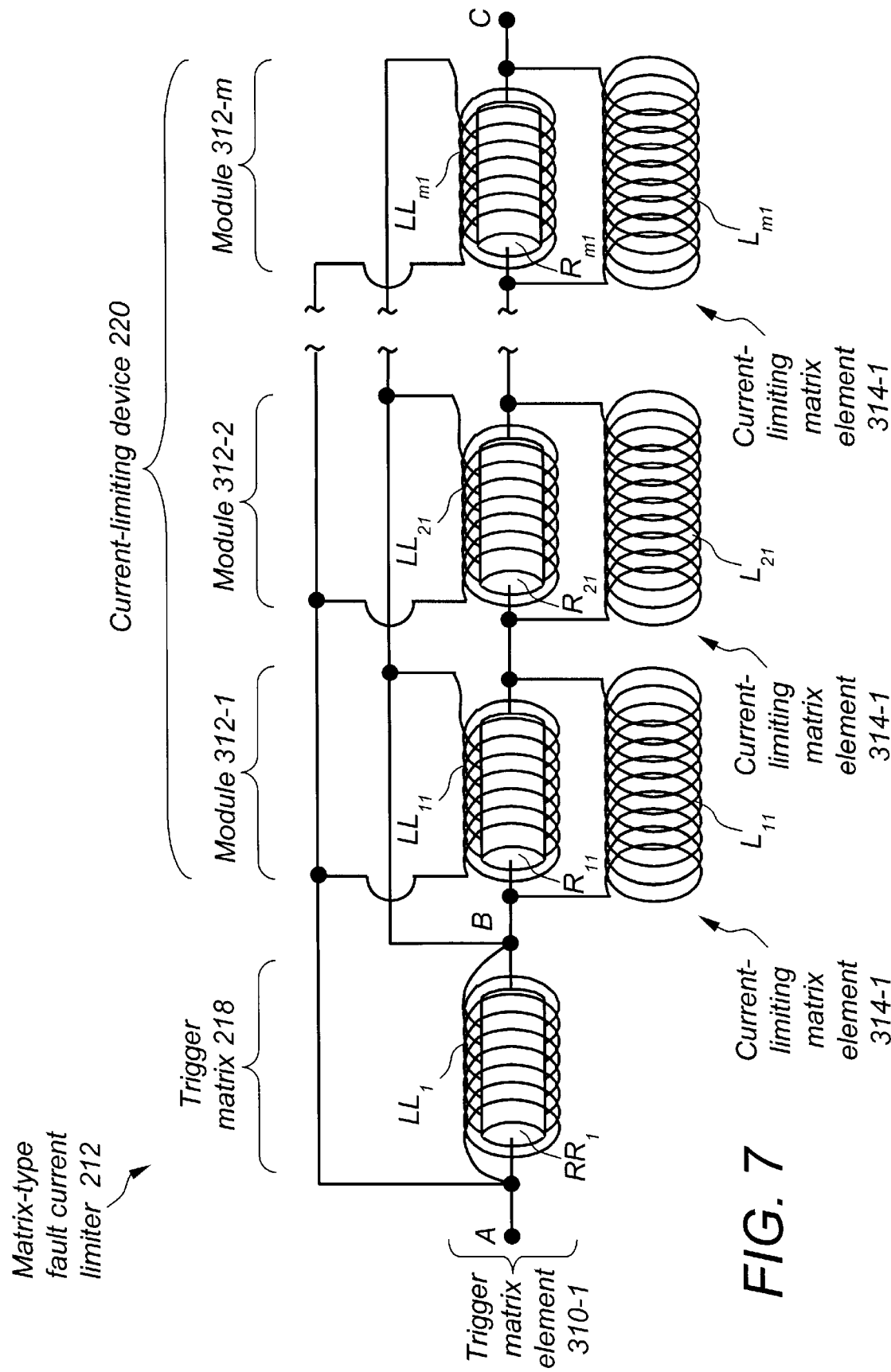
FIG. 7 illustrates an example of the physical relationship between the inductors and the superconductors for the MFCL configured as a simple "(1+m)×1" matrix and an electrical representation thereof.

FIG. 7 shows one row in the trigger matrix 218 with "1" trigger matrix element (i.e., trigger matrix element 310-1) and the same row in the current-limiting matrix 220 having "m×1" current-limiting matrix elements 314 within modules 312-1 through 312-m, respectively. The trigger matrix element 310-1 contains one superconductor $RR_1$, one inductor $LL_1$, and another group of "m" number of inductors $LL_{11}$ through $LL_{m1}$. They are all electrically connected in parallel. Each of the current-limiting matrix elements 314 contains one superconductor R (i.e., superconductors $R_{11}$ through $R_{m1}$) in parallel with an inductor L (i.e., inductors $L_{11}$ through $L_{m1}$).

The inductor $LL_1$ is physically wound around the superconductor $RR_1$. The inductors $LL_{11}$ through $LL_{m1}$ are physically wound around superconductors $R_{11}$ through $R_{m1}$, respectively. That is $LL_{11}$ is wound around $R_{11}$, $LL_{21}$ is wound around $R_{21}$, and so forth.

This physical relationship should repeat for each row (i.e., trigger matrix elements 310-1 through 310-n) in the trigger matrix 218 and its corresponding row (i.e., current-limiting matrix elements 314-1 through 314-n) that has the same row number in the current-limiting matrix 220, with common electrical connection between the trigger matrix 218 and the current-limiting matrix 220 made at node B.

All superconducting components of the MFCL 212 may assume the forms of a bar, a rod, a tube, a bifilar wound solenoid coil, or any other non-inductive form. For example, the superconducting components of the MFCL 212 may be well-known HTS rods or tubes used in current lead applications. The inductors are conventional inductors that are fabricated from non-superconducting electrically conductive materials, such as copper, and may be formed as helically wound solenoid coils (preferred) or racetrack or saddle coils. The MFCL 212 itself can be housed in a cryostat (not shown) that contains a liquid or gaseous or dual-phase ant such as liquid nitrogen or may be cooled by other means such as a cryocooler or a combination of coolant and cryocooler. The cryostat may be composed of non-metallic materials to reduce eddy-current losses, and thereby reducing cooling requirement. The superconductors in the MFCL 212 are maintained at superconducting state by being cooled below their critical temperature with cooling provided either by the coolant within the cryostat or by external cooling mechanism such as cryocoolers or combination of both.

The working principle of the MFCL 212 is now described. To achieve high degree of modularity and scalability of the MFCL components, the preferred embodiment assumes all trigger matrix elements 310 are identical and all current-limiting matrix elements 314 are the same. This means that within the trigger matrix 218, all superconductors $RR_1$ through $RR_n$ are identical, all inductors $LL_1$ through $LL_n$ are identical, and all inductors $LL_{11}$ through $LL_{mn}$ are the same. Within the current-limiting matrix 220, all superconducting components $R_{11}$ through $RR_{mn}$ are identical, while all inductors $L_{11}$ through $L_{mn}$ are identical.

The critical current level of the superconductors RR and R should be no less than one-"n"$^{th}$ (1/n, "n" being the number of rows in the trigger matrix 218 and in the current-limiting matrix 220 of the peak normal operating AC current of the electric power network). This normal operating AC current level should take into account any reasonable fluctuation of current level that normally exists in any electric power network. Such is the case, that under normal operating conditions, the current passes through only the superconducting components within the matrices of the MFCL 212 since superconductors exhibit no electrical resistance in their superconducting state. Since the superconductors are in a non-inductive form, the total impedance of the MFCL 212 device is essentially zero, with no $I^2R$ loss or voltage drop developed between nodes A and C.

When a fault occurs in the network, within the trigger matrix 218 (by analyzing the trigger matrix element 310-1 as an example), the fraction of the fault current that passes through the superconductor $RR_1$ far exceeds its critical current level. This causes the superconductor $RR_1$ to quench and reach a resistive state, exhibiting an electrical resistance of $RR_1$ as a result. This in turn creates a current-sharing regime between the superconductor $RR_1$ and the inductors $LL_1$ and $LL_{11}$ through $LL_{m1}$. At the same time within the current-limiting matrix 220 (by examining the current-limiting matrix element 314-1 of the module 312-1 as an example), the superconductor $R_{11}$ is also triggered to a resistive state by the fault current surge that far exceeds its critical current level, exhibiting an electrical resistance of $R_{nm}$ as the consequence. This then forces the current-limiting matrix element 314-1 into a current-sharing regime between the superconductor $R_{11}$ and the inductor $L_{11}$.

The current flow through the inductor $LL_1$ in the trigger matrix element 310-1 due to the current sharing regime will generate additional magnetic field within the inductors $LL_{11}$ through $LL_{m1}$. Since these inductors are individually wound around each superconductor (i.e., the inductor $LL_1$ on the superconductor $RR_1$, the inductor $LL_{11}$ on the superconductor $R_{11}$, the inductor $LL_{21}$ on the superconductor $R_{21}$, . . . , and the inductor $LL_{m1}$ on the superconductor $R_{m1}$), this puts all the superconductors in an added external magnetic field. When this magnetic field exceeds the critical magnetic field of the superconductors, it creates another mechanism under which the rate and uniformity of quenching in the superconductors are further enhanced. The parallel-connected inductors $LL_1$ and $LL_{11}$ through $LL_{m1}$ ensure that the quenching caused by this added magnetic field occur simultaneously to all the superconductors involved. The temperature rise due to heating by the excessive surge current also contributes to the quenching of superconductors.

The same phenomenon of current sharing, additional magnetic field triggering and temperature rise due to heating by excessive current repeats in all the rows in the trigger matrix 218 and the current-limiting matrix 220 of the MFCL 212.

The parallelism of the trigger matrix elements 310 within the trigger matrix 218 and the parallelism of the current-limiting matrix elements 314 within the current-limiting matrix 220 provides built in redundancy in the MFCL 212 design such that a failure of any individual trigger matrix element 310 or current-limiting matrix element 314 does not result in a failure of the entire MFCL 212. More specifically, in the event of an individual element failure the fault current is automatically redistributed among the remaining trigger matrix elements 310 and current-limiting matrix elements 314 within the MFCL 212 without affecting the overall operation.

Overall all three factors, namely the current surge that exceeds the critical current level of superconducting components, the superconductor temperature rise associated with heating by the excessive current, and the external magnetic field generated by the current sharing regime, all work to promote the transition of superconductors in the MFCL 212 from a superconducting state to a resistive state, creating the effect of a "variable impedance."

Several observations can be made regarding the features and design concerns of the MFCL 212 device:

The parallel-connected inductors in both the trigger matrix 218 and the current-limiting matrix 220 serve to protect superconducting components. The partial divergence of the surged current to the inductors reduces the thermal energy the superconductors absorb during the current limiting phase of the MFCL 212 operation. This makes fast recovery of the MFCL 212 device to its superconducting state more attainable.

The simultaneous triggering of all superconducting components in the current-limiting matrix 220 by the parallel inductors connected to the superconductors in the trigger matrix 218 ensures that the voltage is evenly distributed across each superconducting component.

The helical wound solenoid inductor coil should be long enough so that a superconductor will be situated within a uniform magnetic field region generated by the current sharing regime during a fault. This makes uniform quenching of the superconductor while at the same time reduces mechanical stress on the superconductor.

The number of rows "n" in the MFCL 212 is determined by the peak normal operating current level. More rows can be added to increase the redundancy of the design so that if one or a few superconducting components fail it will not cause a failure of the whole device, making the MFCL 212 device highly reliable. The number of columns "m" in the current-limiting matrix 220 is primarily determined by the current limiting impedance required for a specific electric network, making the MFCL 212 design highly scalable.

The overall impedance of the trigger matrix 218 of the MFCL 212 device during a fault also contributes to the current-limiting impedance $Z_{MFCL}$ of the whole device.

The detection of a fault, the activation of the current-limiting impedance and subsequent recovery of the MFCL 212 to the superconducting state, are all done passively by built-in matrix and device design, without assistance of any active switching and/or any controlling mechanism. This use of only passive components rather then active control devices further contributes to high reliability.

Figure 8:
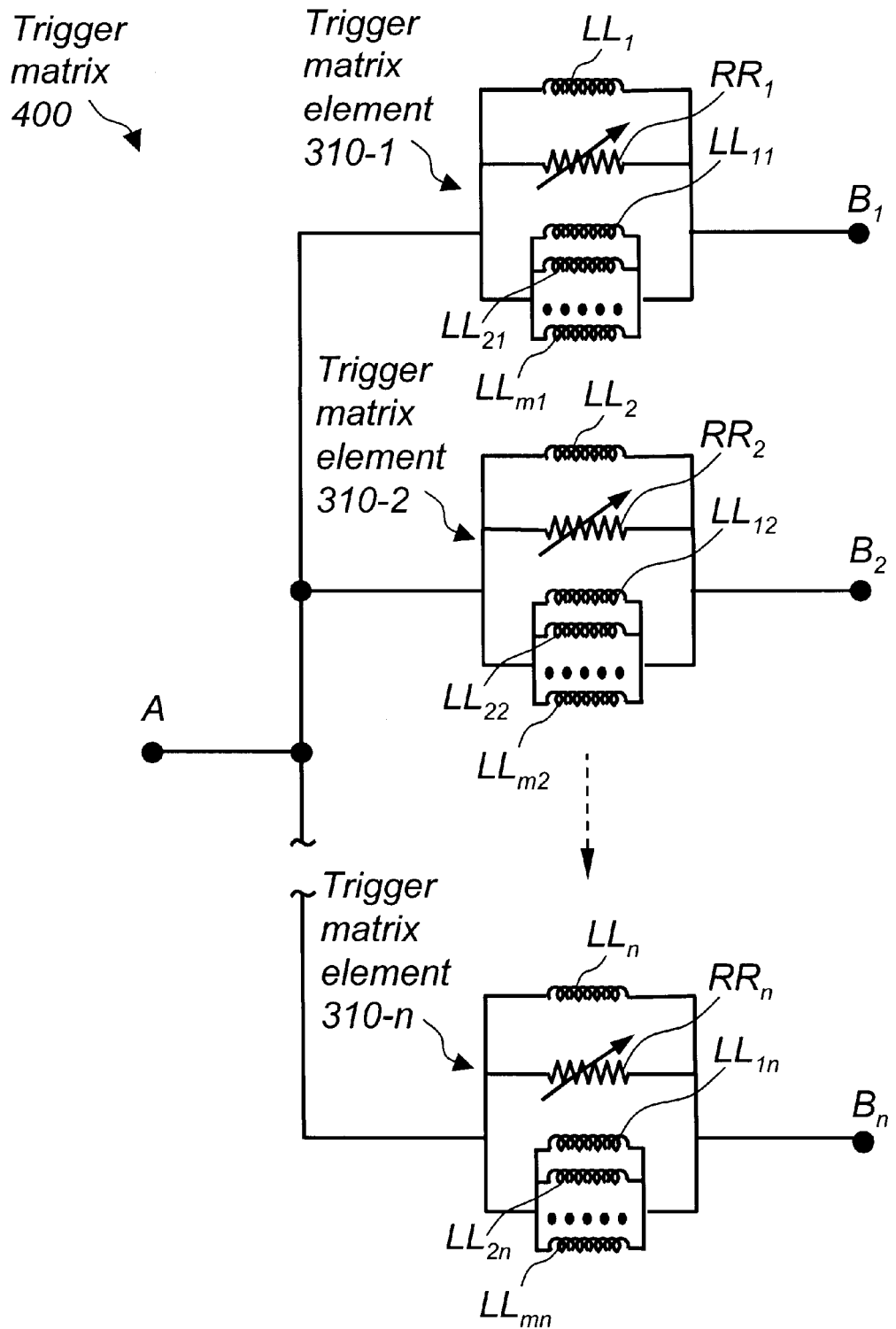
FIG. 8 shows a schematic diagram of an alternative embodiment of a trigger matrix within the MFCL of this invention that includes a plurality of trigger matrix elements (the rows in the trigger matrix) 1 through "n" electrically connected in parallel.
Figure 9:
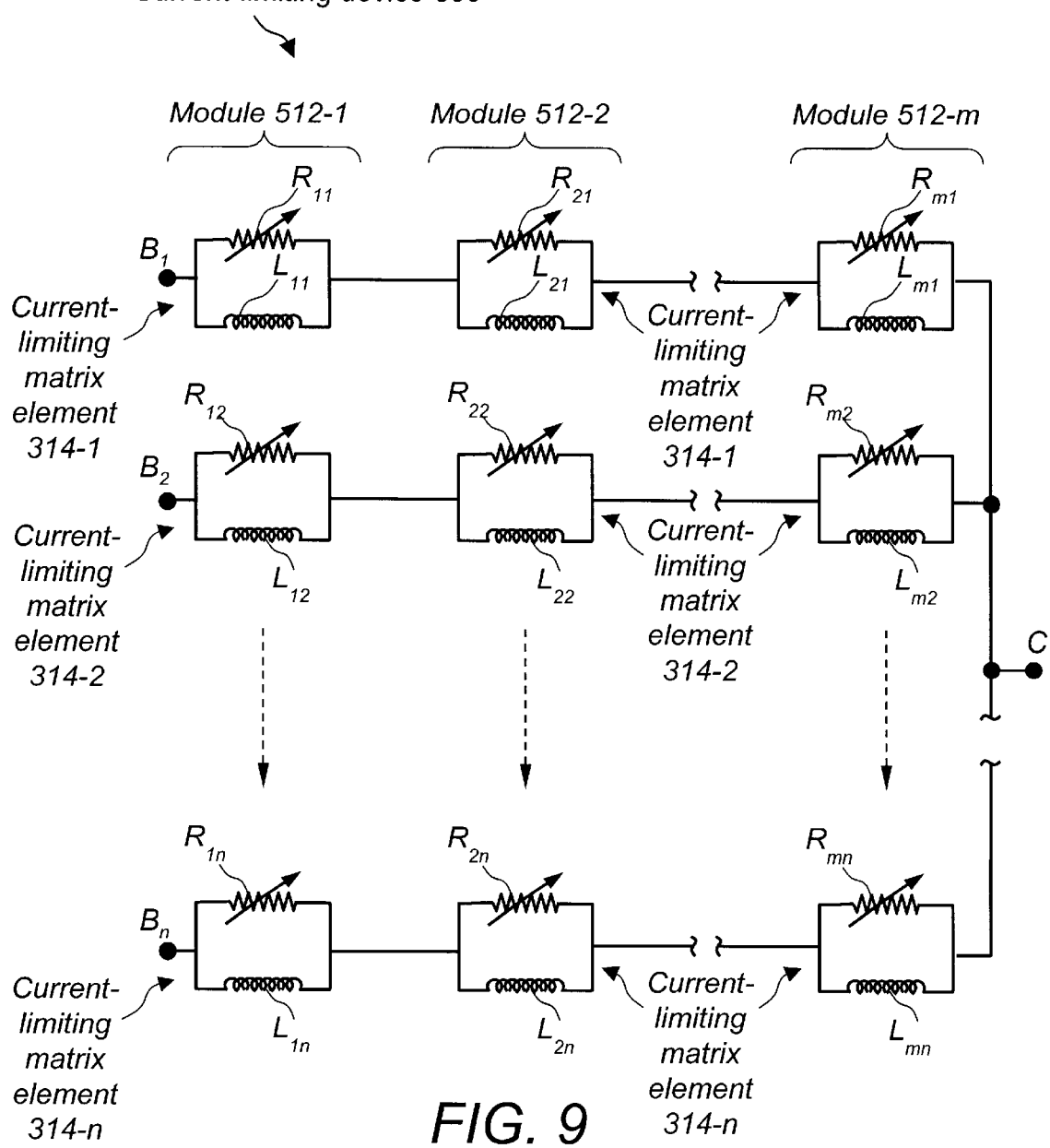
FIG. 9 shows a schematic diagram of an alternative embodiment of a current limiting matrix within the MFCL of this invention that includes a plurality of current-limiting modules (the columns in the current-limiting matrix) 1 through "m" electrically connected in series.
Figure 10:
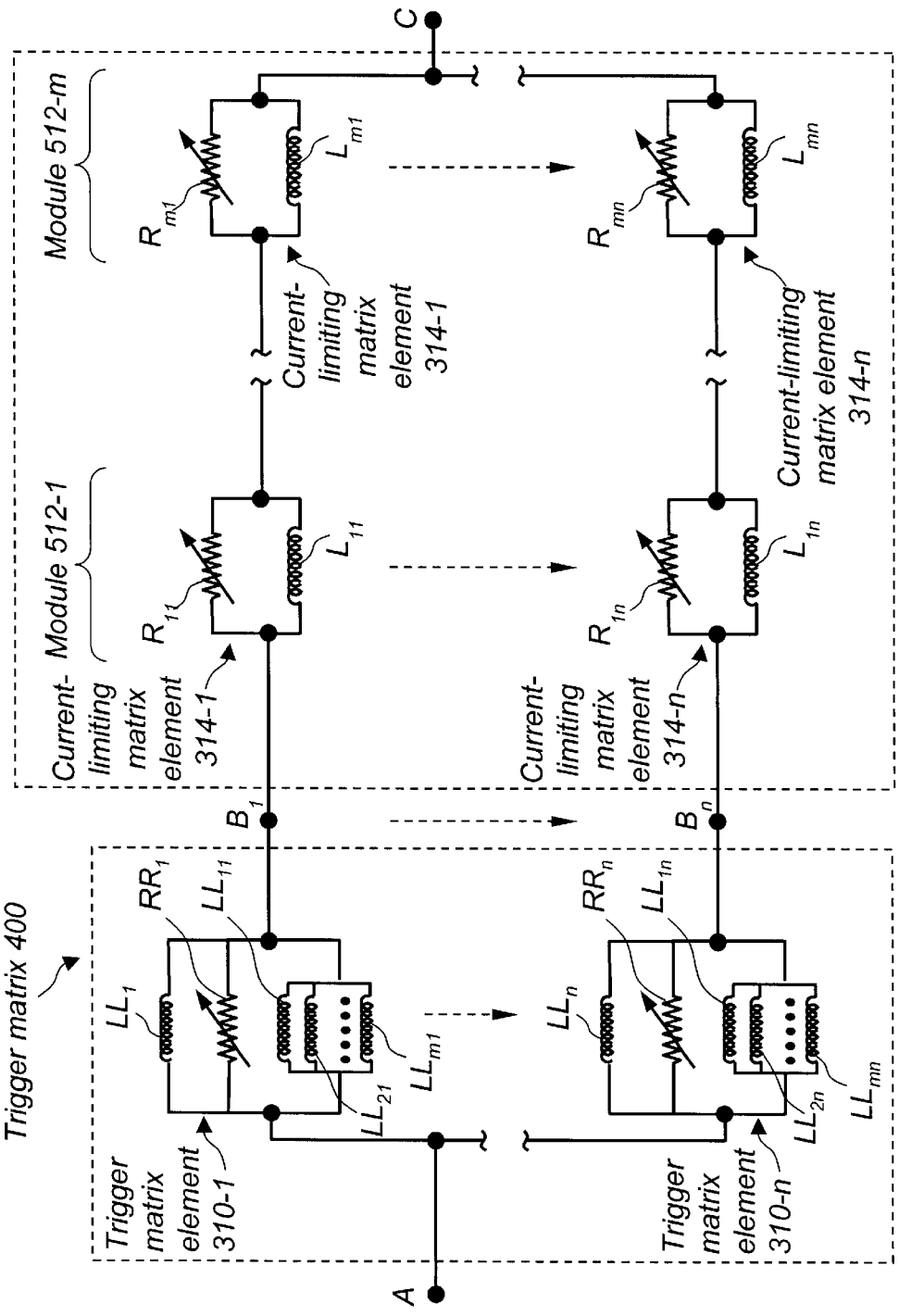
FIG. 10 shows a schematic diagram of the alternative embodiment of a complete MFCL of this invention that includes both the trigger and current-limiting matrices.

In an alternative embodiment of the invention, the MFCL 212 includes a trigger matrix 400 as described in FIG. 8 for use in combination with a current-limiting matrix 500 as described in FIG. 9. FIG. 10 gives a more comprehensive overview of schematic diagrams of the trigger matrix 400 and the current-limiting matrix 500 for this alternative embodiment in the context of a complete MFCL 212.

In this alternative embodiment, each trigger matrix element 310 and "m" number of current-limiting matrix elements 314 in the modules 512-1 through 512-m are electrically connected in series, forming a serial path of "1" trigger matrix element 310 and "m" current-limiting matrix elements 314. This serial path is then electrically connected in parallel with other serial paths between nodes A and C of the MFCL 212. For example, the serial path formed by the trigger matrix element 310-1 feeding via node $B_1$ the current-limiting matrix elements 314-1 of the modules 512-1 through 512-m are arranged in parallel with the serial path formed by the trigger matrix element 310-2 feeding via node $B_2$ the current-limiting matrix elements 314-2 of the modules 512-1 through 512-m, and so on through the serial path formed by the trigger matrix element 310-n feeding via node $B_n$ the current-limiting matrix elements 314-n of the modules 512-1 through 512-m within the trigger matrix 400 and the current-limiting matrix 500. The complete circuit shown in FIG. 10 of the MFCL 212 of this alternative embodiment is in essence, a "1×n" (column×row) matrix, as compared to a "(1+m)×n" matrix for the first (preferred) embodiment. The physical relationship of the superconductors and inductors relative to one another within one serial path of the trigger matrix 400 and the current-limiting matrix 500 is identical to that described in FIG. 7. The current-limiting operating principle of this alternative embodiment of the MFCL 212 is also identical to the first (preferred) embodiment of this invention.

Other embodiments of the MFCL 212 of the present invention may broadly include variations in the precise components or precise arrangement of components within the trigger matrix 218 and/or the current-limiting matrix 220 of the preferred embodiment of present invention. For example, the trigger matrix 218 may be modified to include the superconductors $RR_1$ through $RR_n$ arranged in series with the inductors $LL_1$ through $LL_n$, respectively, instead of in parallel, or combinations of serial and parallel connections. As another example, the modules 312 (i.e., modules 312-1 through 312-m) of the current-limiting matrix 220 may be modified to include only the superconductors $R_{11}$ through $R_{1n}$, without the parallel-connected inductors $L_{11}$ through $L_{1n}$, respectively. As yet another example, the current-limiting matrix 220 may be modified such that the modules 312 (i.e., modules 312-1 through 312-m) include only one inductor L connected in parallel with all "n" superconductors $R_{11}$ through $R_{1n}$. As yet another example, there may be only one inductor L arranged in parallel with the entire current-limiting matrix 220.

What is claimed is:

1. A matrix-type superconducting fault current limiter comprising a trigger matrix section and a current limiting matrix section, wherein the trigger matrix section and the current limiting matrix section are electrically connected in series with one another, and are composed of components made of superconducting and non-superconducting electrically conductive materials, wherein the trigger matrix section comprises n, n being $\geq 1$, trigger elements arranged in a one column×n row matrix fashion where the n number of trigger elements are electrically connected in parallel with one another, each trigger element comprising at least one non-inductively arranged superconducting component electrically connected in parallel with a plurality of non-superconducting components, and wherein the current limiting matrix section comprises m×n, with m being $\geq 1$, current limiting elements arranged in a m column×n row matrix fashion where n number of current limiting elements are electrically connected in parallel with each other to form one current limiting module, and where m number of current limiting modules are electrically connected in series with one another, each current limiting element comprising at least one non-inductively arranged superconducting component electrically connected in parallel with at least one non-superconducting component.

2. The fault current limiter of claim 1 comprising superconducting components that are in the form of rods, bars, tubes, bifilar-wound solenoid coils or other non-inductive forms.

3. The fault current limiter of claim 2 wherein the non-superconducting components are coils made of electrically conductive materials and are arranged in the form of helically-wound solenoid coils, racetrack coils or saddle coils.

4. The fault current limiter of claim 3 wherein the number of non-superconducting components in each trigger element is 1+m, each of which is physically wound around the superconducting component of such trigger element and m number of superconducting components that have the same row n number in the current limiting elements of the current limiting matrix.

5. The fault current limiter of claim 3 wherein a single non-superconducting inductive or resistive component is electrically connected in parallel to the entire current limiting matrix section, with or without an additional non-superconducting component electrically connected in parallel with the superconducting component in a current limiting element.

6. The fault current limiter of claim 3 wherein a part of the device is located in a metallic or non-metallic cryostat, and is cooled by liquid, gaseous or dual phase coolant or by means of a cryocooler or a combination of both.

7. The fault current limiter of claim 1 where n is greater than 1.

8. The fault current limiter of claim 1 where m is greater than 1.

9. A fault current limiting device incorporating superconducting and non-superconducting electrically conductive materials comprising a trigger matrix section and a current limiting matrix section wherein the number of rows "n" in both matrices is primarily determined by the peak normal operating current level such that this peak current level divided by the number of rows in the matrices does not exceed the critical current level of an individual superconducting component used in the fault current limiting device matrices;

the number of columns "m" in the current limiting matrix is primarily determined by the current limiting impedance requirement for a specific electric network such that the sum of the total impedance of the trigger matrix section, and the total impedance of the current limiting matrix section after the superconducting components have transitioned to their non-superconducting resistive state is no less than the minimum current limiting impedance requirement for the specific electric network to which it is connected.

10. The fault current limiting device of claim 9 wherein, under normal operating conditions, the current passes through only the non-inductively arranged superconducting components within the fault current limiting device, thus producing no voltage drop across the device or $I^2R$ loss due to the zero electrical resistance nature of the superconducting materials, and wherein, when a fault condition occurs, the surge current in the electric network exceeds the critical current level of the superconducting components, creating a transition from a superconducting state to a normal resistive state thereby creating a current sharing regime between the superconducting component and the inductor group in a trigger matrix element, and between the superconducting component and the inductor in a current limiting matrix element and generating a magnetic field which exceeds the critical magnetic field level of the superconducting components in the device, further promoting the transition of a superconducting component from a superconducting state to a normal resistive state.

* * * * *